Witnesses:
Horace A. Crossman
Sidney F. Smith

Inventor:
George F. Stewart
by Emery & Booth,
Attys.

Fig. 4.

No. 871,962. PATENTED NOV. 26, 1907.
G. F. STEWART.
BUFFING MACHINE.
APPLICATION FILED JULY 13, 1906.

Witnesses:
Horace A. Crossman
Sidney H. Smith

Inventor:
George F. Stewart
by Emery & Booth,
Attys.

No. 871,962. PATENTED NOV. 26, 1907.
G. F. STEWART.
BUFFING MACHINE.
APPLICATION FILED JULY 13, 1906.

Witnesses:
Horace A. Crossman
Sidney F. Smith

Inventor:
George F. Stewart
by Emery & Booth
Attys.

UNITED STATES PATENT OFFICE.

GEORGE F. STEWART, OF LYNN, MASSACHUSETTS, ASSIGNOR TO MANUFACTURERS MACHINE COMPANY, OF MONTCLAIR, NEW JERSEY, A CORPORATION OF NEW JERSEY.

BUFFING-MACHINE.

No. 871,962. Specification of Letters Patent. Patented Nov. 26, 1907.

Application filed July 13, 1906. Serial No. 326,009.

*To all whom it may concern:*

Be it known that I, GEORGE F. STEWART, a citizen of the United States, residing at Lynn, in the county of Essex, State of Massachusetts, have invented an Improvement in Buffing-Machines, of which the following description, in connection with the accompanying drawings, is a specification, like letters on the drawings representing like parts.

This invention relates to buffing machines of the type commonly known in the art as Naumkeag machines, distinguished by the fact that the buffing pad is of general disk shape and made to rotate about a vertical axis at the center of the disk, contradistinguished from buffing machines employing buffing rolls, about which the abradant paper or cloth is wrapped.
The roll machines are commonly used upon the bottoms of fore parts of boots and shoes, while the Naumkeag machine is more generally used for what is known as "shanking out", that is, for finishing the shanks, for which use it is better adapted because the disk form of pad permits the buffing to be carried down closer to the breast of the heel and into the concave breast, whereas with a roll the buffing could be carried no nearer to the heel than the length of the radius of the roll.

My invention contemplates the use of a multi head machine, preferably of three heads, adapted for different grades or kinds of work, and my invention also contemplates various improvements in the means for holding the pad covers, whereby a great saving is effected in the amount of abradant fabric or material required for any single pad.

My invention also contemplates various improvements in the means for applying the pad covers to the pad intended to facilitate such application.
The above with other features of my invention will be hereinafter more fully disclosed, and will be best understood from a description of the same in connection with one embodiment thereof shown in the accompanying drawings.

Referring to the drawings:
Figure 1,—is a side elevation and illustrates a machine made in accordance with one embodiment of my invention;
Fig. 13, a sectional detail of the third spindle and its holder, to be referred to.

Figure 4:
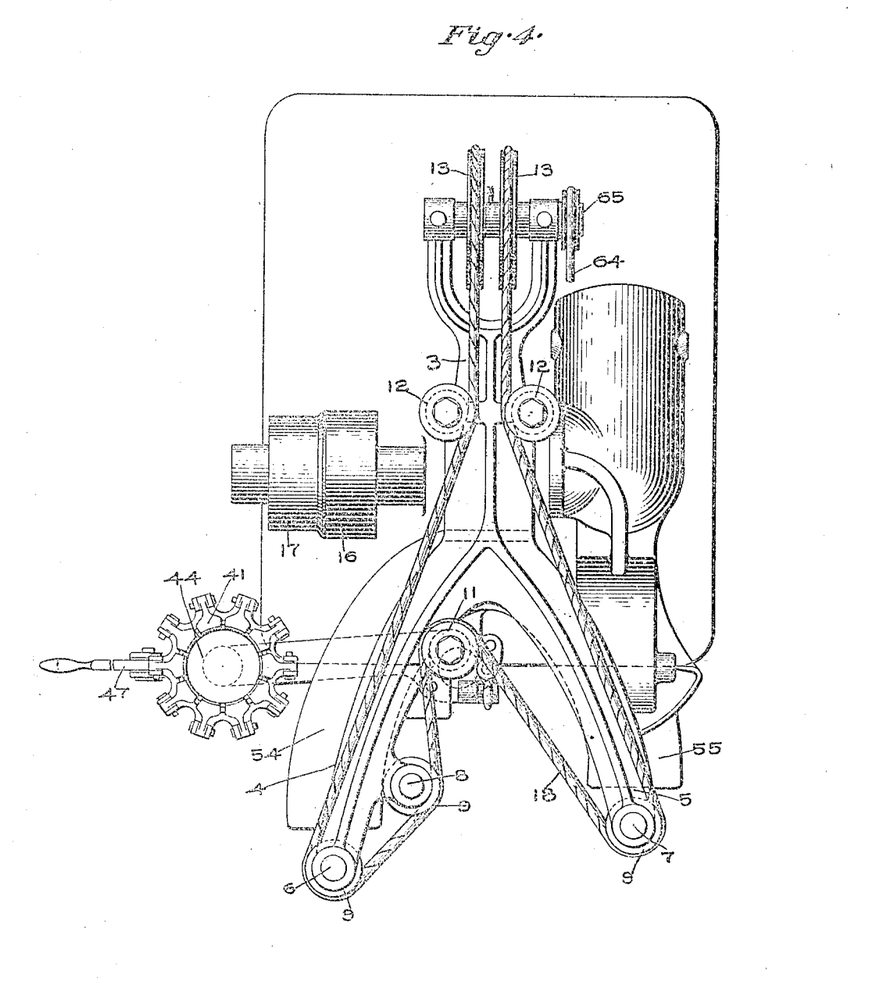
Fig. 4,—on an enlarged scale shows a top or plan view of the machine in Fig. 1.

Referring to the drawings, in the particular embodiment of my invention selected for illustration herein and shown in the drawings, the column, 1, of suitable shape and construction to sustain the working parts, is provided at its upper end with a head, 2, which (see Fig. 4) is of general Y-shape, the stem, 3, of the Y extending rearwardly, and the two arms, 4, 5, extending forwardly toward the operator.

Figure 2:
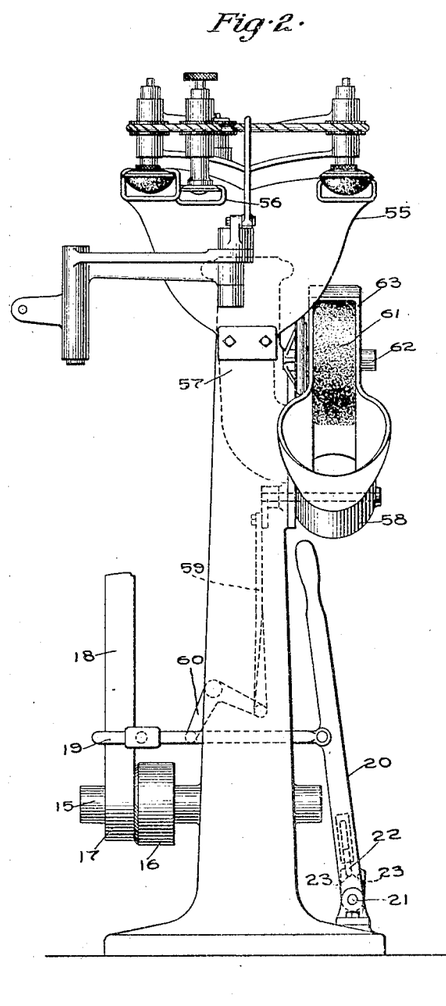
Fig. 2,—a front elevation of said machine.
Figure 3:
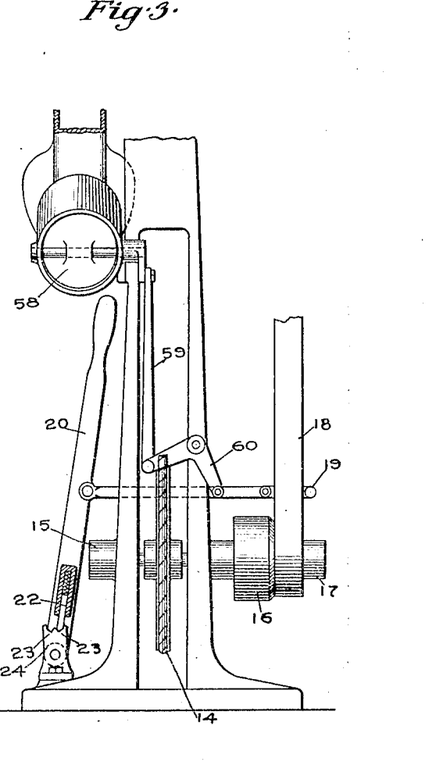
Fig. 3,—a partial rear elevation of the same.

The pad spindles are shown as mounted in the forwardly extended arms 4 and 5, and are herein shown as three in number, the two spindles 6 and 7, at the outer ends of the arms, being substantially similar, while the spindle 8, shown as carried at the inner side of the arm, 4, is preferably of a different construction. Each of the spindles, however, is driven by a grooved pulley, 9, the several pulleys being driven by a common pulley, 10, passed about the two pulleys at the ends of the arms and against one side of the pulley on the spindle 8, around an idler, 11 (Fig. 4), thence rearward between two idlers, 12, to go over a pair of vertically arranged idlers, 13, journaled in the forked rear end of the stem of the machine-head 3, thence downward at the rear of the machine to and about a driving pulley 14, fast on the drive-shaft, 15 journaled in bearings in or carried by the column near the base thereof. This drive-shaft may be driven in any suitable manner, preferably, however, by fast and loose pulleys, 16 and 17, (Fig. 2.) adapted to receive a belt, 18, under the control of a suitable shipper, 19: This shipper is mounted to slide horizontally in bearings upon and at the rear of the column, and is controlled by a shipper lever, 20 (see Fig. 2). This shipper lever is fulcrumed at its base at 21, and, a short distance above its base, is provided with a spring-pressed latch, 22, adapted to coöperate with one or another of two seats, 23, in a holder, 24, arranged adjacent to said fulcrum. This spring-pressed latch yields against a sufficient pressure exerted by the operator, tending to throw the lever into one or another of its extreme positions, and which is sufficient to retain said lever in the attached shipper against displacement when once it has been moved into desired position.

By driving all the spindles, whatever be the number thereof, by a single belt, there is much less liability of delays from broken belts, because the longer the belt, the longer the period of wear without breakage under given conditions.

Figures 10, 11, 12:
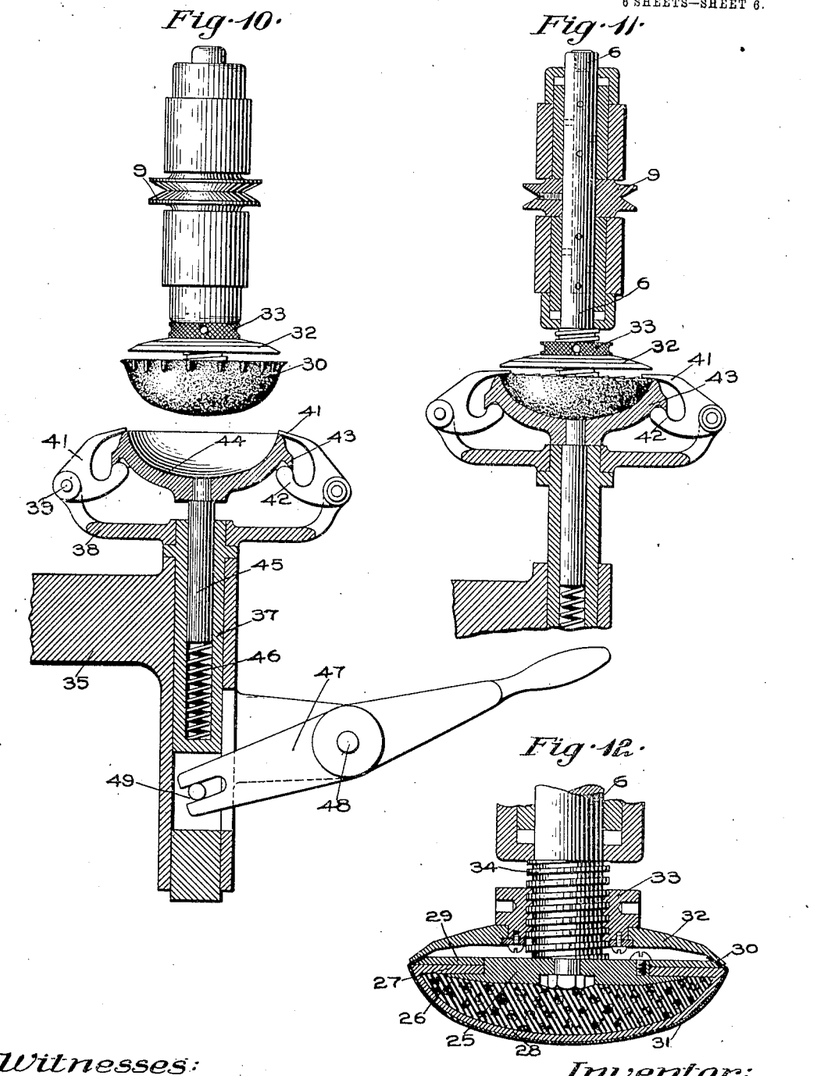
Fig. 10,— a detail showing in elevation and partial section one of the pads, its spindle, and the cover applying device in position beneath the same.
Fig. 11,—a somewhat similar view showing the pad cover applying device in the act of applying a pad.
Fig. 12,—an enlarged sectional detail showing the preferred means for clamping the pad cover in position.

Referring now particularly to Figs. 10, 11 and 12, the spindle 6 has attached to its lower end a pad-carrying plate, 25, provided at its periphery with a supporting flange or lip, 26, to receive and support the inturned lip or flange, 27, of a pad, 28. This pad is of the usual shape exteriorly, common to the pads of Naumkeag machines, and it may be of any desired internal construction, either pneumatic, to be inflated by air or filled with felt, or any other yieldable or soft resilient material that will present a sufficient cushion pad face. Overlying the inturned pad lip 27 is a flat ring, 29, shown as fitting the hublike center portion of the disk, 25, and presenting a beveled peripheral edge adapted to receive the inturned lip, 30, of the pad cover, 31, applied to the pad. This pad is held clamped in position for use by a cup-shaped cap, 32, rotatably carried by and at the lower side of a nut, 33, screwed upon the threaded lower end, 34, of said spindle 6. When this nut is screwed down upon this threaded spindle, the cap is caused to clamp the inturned lip 30 of the pad cover tightly between itself and the ringlike clamping plate 29 referred to. It will be observed that the clamping action is wholly between the cap and the plate 29, and not between said cap and the pad 27, as in machines of this type heretofore made so far as known to me. The advantage is this: By clamping the coverlip between two metal or other surfaces that are independent of the pad itself, the circle of clamping action may be carried nearly or quite to the periphery of the pad without destroying the resilience of the pad near or at its periphery. The pad itself being incapable of resisting any clamping action must be supported from within by a disklike plate, which, being carried to the periphery of the pad to support the clamping action thereby, destroys resiliency of the pad, and which, if carried within toward the center of the pad so as to leave the pad unrestrained near its periphery, requires a lip on the pad cover very much deeper than shown in the drawings, requiring almost double the amount of abradant material required in the formation of the pad. Furthermore, by using a very narrow inturned cover lip, the latter may be made substantially continuous and not tongued, as is required where the lip is deep, as in machines as at present used. These pad covers are usually molded up in advance, and, to apply them nicely, is so difficult an operation that it has been common to provide machines of this type with cover applying devices which are adapted to receive a pad cover and apply it mechanically to the pad, and there hold it until it can be clamped in position. In machines as heretofore constructed, these cover applying devices have been located at one side of the machine on the arm thereof, and when a new cover is to be applied the pad-carrier, made detachable from its spindle for this purpose, has been detached and placed in the cover applying device at one side of the machine in order that its pad may receive the intended cover and thereafter the carrier, with its cover pad is replaced on the spindle, before the machine is again ready for use. In the machine herein shown, however, the cover applying device, while normally mounted at one side of the machine and out of interference with the operative and his work, is, nevertheless, made movable to enable it to be brought into position directly beneath that and in alinement with the axis of the spindle carrying the pad which is to be covered, so that the cover may be applied to the pad without removing it or its carrier from the spindle upon which it is used. In the machine shown, there being a plurality of pad-carrying spindles, the cover applying device is so mounted as to be movable into position to apply a cover to either spindle as required.

Figures 5, 6, 7:
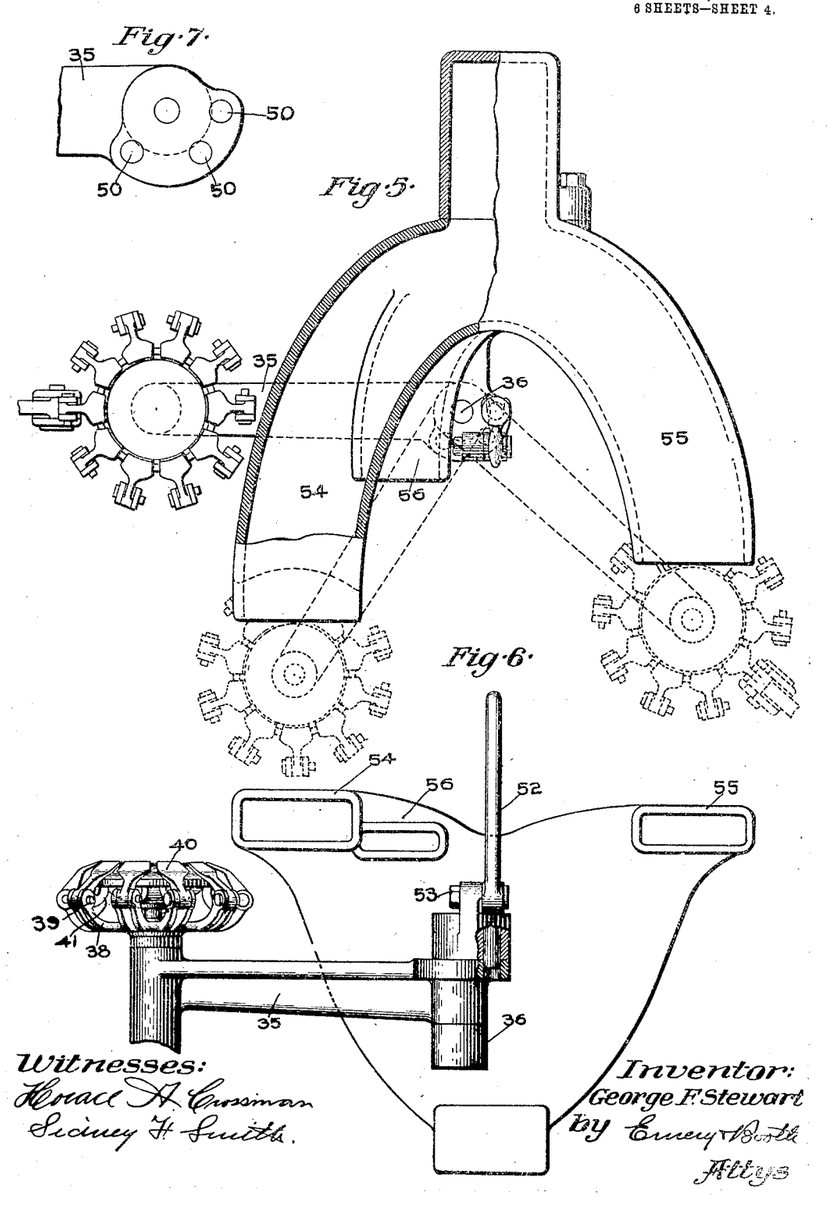
Fig. 5,—a view on a still larger scale, showing the arrangement of air conduits for taking care of the dust, this view also showing the normal location of the pad cover applying device.
Fig. 6,—a front elevation of Fig. 5.
Fig. 7,—a detail of the pad cover applying arm and locking holes for positioning the same.
Figure 8:
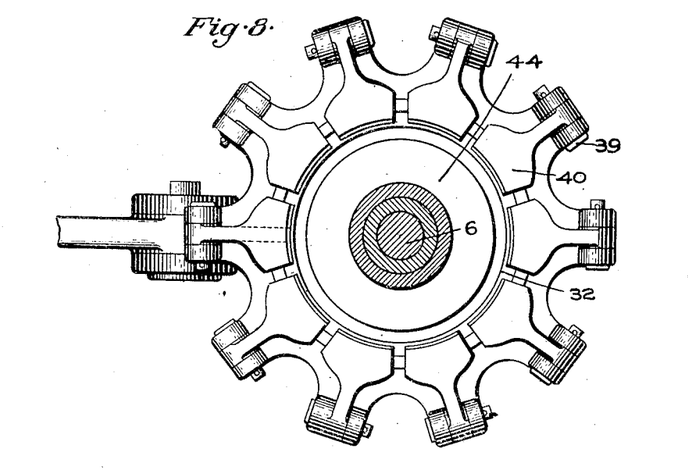
Figs. 8 and 9,— are views showing in plan different positions of the pad cover applying device.
Figure 9:
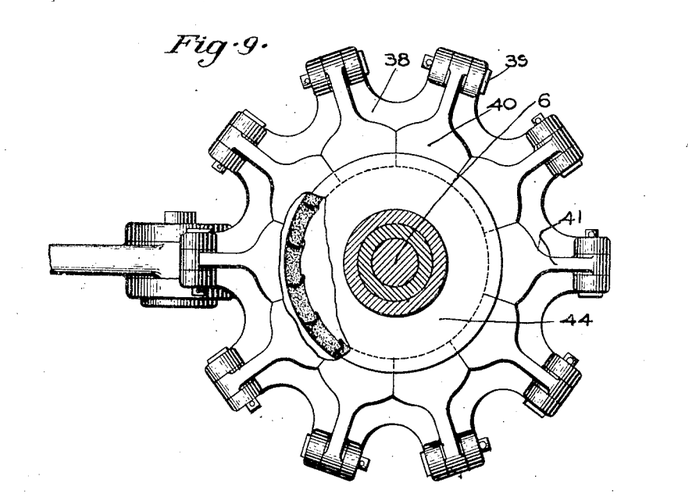

Referring particularly to Fig. 5, the cover applying device is shown at C mounted upon the end of an arm, 35, fulcrumed upon the frame at 36, the dotted lines indicating the different positions into which it may be moved.

Referring to Figs. 8 to 11, inclusive, this cover applying device is constructed as follows: The outer end of the carrying arm 35 is provided with a vertically arranged head made tubular to receive a hollow stem, 37, of the spider, 38. This spider presents a series of radial arms, in which are pivoted at 39 a series of infolders, 40, shown as claw-shaped, the upper arms 41 of which constitute the infolders proper, and, if viewed from the top (see Figs. 8 and 9) are of a general spadeshape, while the lower arms, 42, underlie and are adapted to be engaged by a lip, 43, on the depressible actuator, 44. This actuator is shown as cup-shaped, and preferably is of an internal shape exactly fitting the desired external shape of the pad cover when applied to its pad. This actuator is mounted upon the upper end of a spindle, 45, which slides freely in the tubular stem, 37, of the spider, 38, and is supported from beneath by a spring, 46, which permits it to yield downwardly when required, and as will be described. The tubular stem, 37, together with the cup-shaped actuator and the infolders are made vertically movable in the arm, 35, by a lever, 47, fulcrumed at 48, on the arm-head, and enter a slot in said stem, with which it is connected by a pin, 49, as shown.

When the pad cover is to be applied, the arm 35 is swung into position beneath the spindle carrying the pad to be covered, as shown in Fig. 10. The pad cover may now, if desired, be deposited in the cup-shaped actuator, 44, or, as I prefer, it is applied loosely to and about the pad to be covered. The operative then depresses the handle end of the lever, 47, and lifts the stem, 37, with the device carried thereby to meet the cover loosely placed on the pad. As the lifting progresses the cup-shaped actuator, 44, brings up against the cover at its pad, and is thereby prevented from moving further vertically, so that further vertical movement of the stem by lifting the spider and the infolders relative to the now stationary actuator operates to cause said infolders, acted upon by the lip 43, Fig. 10, to be turned inward, converging toward the center of said actuator, and, pushing before them the upturned lip, 30, of the cover, said infolders acting to lay the said lip downward against the beveled periphery of the disk, 29 (Figs. 11 and 12). The handle lever is now retracted to permit the spring 46, which was compressed during the upward movement of the stem, to return to said stem downward somewhat to cause the infolders, acted upon by the lip 43 of the actuator to be withdrawn sufficiently to permit the clamping cap 32 to be screwed down upon and to hold the infolded lip of the cover. Preferably the infolders will be retained overlying and holding the outer peripheral edge of the infolded lip until the clamping has been completed, after which the actuator and infolders are permitted to drop to their original positions and the arm swung again to one side or into position beneath another of the spindles.

When the cover has been clamped as described, the handle is restored to its original position, withdrawing the infolders and then dropping them and the actuator into their normal positions in the arm 35, after which said arm is swung back to its original position or swung to the other spindle to apply a cover thereon, as may be needed. As the stem 37 is lowered, the spring 46 by raising relatively the actuator 44 operates by contact of the peripheral edge of said actuator with the infolding arms 41 to open the latter away from and clear the pad, as shown in Fig. 10.

To facilitate centering the cover applying device under and in alinement with either of the spindles to which a pad cover must be applied, the hub-end of the arm 35 (see Fig. 7) is provided with a series of holes, 50, shown as three in number, one for each of the spindle positions and the third for the normal position of disuse, and adapted to receive a plug or pin, 51, (see Fig. 6) operated by a handle lever, 52, fulcrumed at 53. When the arm is to be swung into position, this handle lever, 52, is turned into vertical position to lift the pin, 51, from one of the holes, 50, thereby to free the arm and permit the latter to be swung into desired position. The end of this pin is tapered or mounted, so that by drawing the handle lightly forward when the arm approaches the desired position this tapered end of the pin will find one of the holes positioned therefor, and will act upon the depression of the handle to center or aline the pad applying device accurately to the spindle carrying the pad to be covered.

The third spindle, 8, may, if desired, be provided with a pad and cover similar to the others, but preferably I shall employ an abradant cover of what is known as the "pin wheel" type, the same being nothing more nor less than a flat disk of an abradant material, such as sand paper or emery cloth. This spindle and its holder and cover are shown in detail in Fig. 13, the spindle 8 in this instance, however, being tubular and provided at the lower end with a flanged head 68, on which is removably secured a flat ring or washer 69, of suitable resilient material preferably leather. The lower face of this washer is provided with a cover or disk 70 of sand paper, emery cloth or other abradant material which is removably clamped against said washer by the button-like head 71ª of a screw 71. That this cover supporting and clamping screw may be readily removed from said spindle to facilitate applying the cover or disks, its upper end is threaded at 72 to engage a long stemmed nut 73, removably and rotatably mounted in the upper portion of said spindle. The upper end of the stem of this nut 73 is provided with a milled head 74, to facilitate turning it and also with a circumferential groove to receive the end of a screw 75, thereby permitting rotation of said nut and preventing it from moving longitudinally in the spindle.

Figures 1, 13:
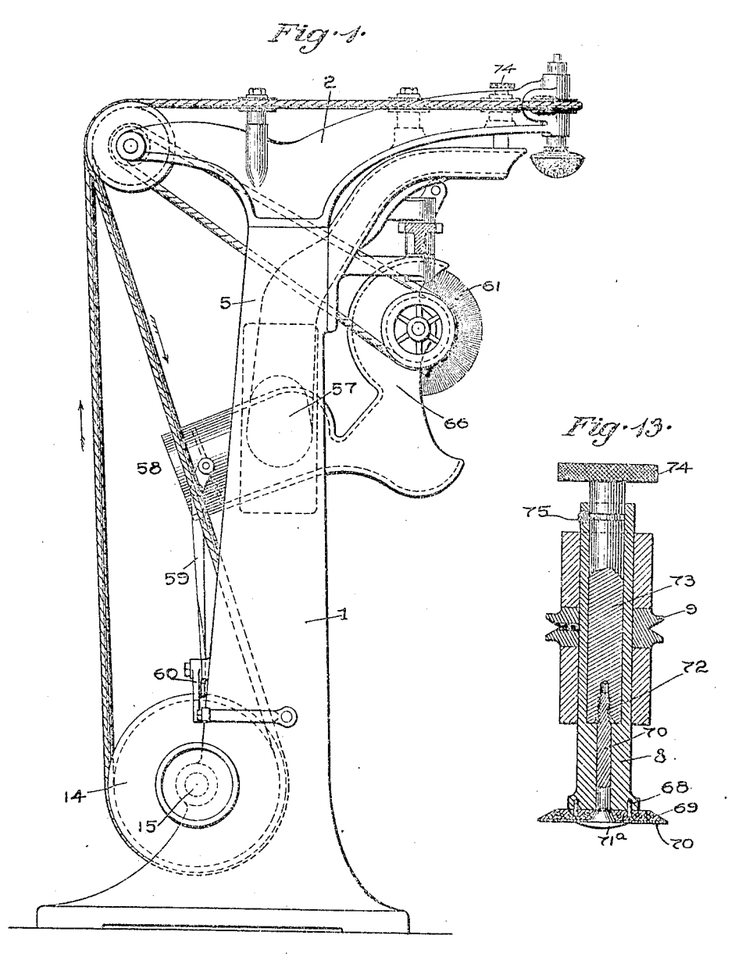

By inserting the screw 70, having a disk positioned upon its head, into the lower end of the spindle and then turning said nut, the screw may be elevated to firmly clamp the cover against its washer support. Upon unscrewing the nut the screw and its cover or disk of abradant material may be quickly removed and a new cover applied.

The peripheral edge of the washer is beveled inwardly to add resiliency to its edge, so that it more readily adapts itself to the work.

The holders or bearings for the spindle are of the same construction as those for the spindles 6 and 7, intermediate which the spindle is provided with the grooved driving pulley 9, referred to.

Referring now to Figs. 1, 2, 5 and 6 to conduct away the dust produced by the action of the various abradant covers or pads, I have provided a series of conduits, 54, 55 and 56, the conduits, 54 and 55, having their outlets directly in the rear of the two pads on the spindles 6 and 7, respectively, while the third outlet, 56, stands in the rear of the pad on the spindle, 8. These inlets are as close as possible to the pads, which they are to care for, and, at the same time, leave sufficient clearance for the cover applying device to be brought into position. As here shown, the two conduits 54 and 55 are joined at their inner ends, while the conduit 56 springs as a branch from one of them, viz:—the conduit 54. All these conduits merge into a single conduit, 57, which (see Fig. 1) extends downward within the column and at the rear thereof, where its outlet is controlled by a damper, 58, shown as connected by a rod, 59, and bell crank, 60, with the shipper-rod, 19. By this arrangement when the shipper is moved to cut off the power, the damper is closed and the suction at that particular machine stopped until the machine is again to be put into use. This is of great importance in a factory employing a large number of machines that are required to be supplied with suction apparatus for removing the dust, for, as a rule, quite a percentage of the machines are always in disuse, for instance, when the operatives are delivering or receiving work, or adjusting machines. So far as I know, this is the first instance where the suction has been controlled automatically by the starting and stopping means of the machine to which the suction is applied.

I am aware that suction fans have been applied to individual machines and started and stopped with the machines being driven by the same power-shaft, but my invention contemplates connecting these machines by branch pipes with large suction conduits leading to a central suction fan, which is operated by the main engine of the factory, and which operates continuously whether the individual machines are in operation or not.

At the front of the column 1 (see Fig. 1) is arranged a brush, 61, mounted upon a shaft, 62, provided with a pulley, 63, connected by a belt, 64, with a pulley, 65, on the shaft of the idlers, 13, to be driven by the latter. This brush is protected by a hood, 66, as shown in Fig. 1, connected with the main suction, 57, of the machine.

The machine disclosed provides pads of such number and arrangement as to permit of different grades of work, particularly in boot and shoe making, to be performed thereon with the greatest facility and with the least movement from position by the operative. Preferably the spindle 6 will be located farther to the front than the spindle 7, and the latter somewhat farther front than the spindle 8, and, also preferably, the lower operative end of the spindle 8 will be below the corresponding ends of the spindles 6 and 7, the holder being intended to enable the operative without taking any step to reach all of the spindles conveniently.

When buffing the bottoms of boots and shoes, the operative will ordinarily first present the shank of the shoe to the pin wheel spindle 8 and clean out the rear end of the shank ends to breast of the heel. He will then present the shank to the pad cover on the left-hand spindle 6 to grain or preliminarily buff the rest of the shank, and then will present the shoe to the spindle 7 for finishing the shank, and also the ball, which latter has been previously grained upon the usual roller buffer.

I have described one embodiment of my invention, and, without limiting myself thereto or to details thereof, I claim and desire to secure by Letters Patent—

1. A buffing machine of the class described, provided with a support having diverging arms, an upright buffing spindle in and at the end of each of said arms, an additional buffing spindle carried by and at the side of one of said arms, and suction means comprising diverging conduits leading respectively to the spindles at the ends of said arms, and an additional conduit projecting from the side of one of said conduits for the spindle at the side of said arm.

2. A buffing machine having, in combination, a buffing tool, suction means for carrying off waste products, means for starting and stopping the tool, and a valve under control of the starting and stopping means for rendering the suction means functionally operative and inoperative as the tool is started and stopped.

3. A buffing machine having, in combination, a plurality of buffing spindles, a single driving means for said spindles, a dust conduit for said spindles, means for starting and stopping the spindle driving means, and a shut-off for the dust conduit for rendering the suction means functionally operative and inoperative as the spindles are started and stopped.

4. A buffing machine having, in combination, a buffing tool, a dust conduit having an inlet in co-acting relation therewith, means for starting and stopping the movement of said buffing tool, and a shut-off for the dust conduit under control of the tool stopping and starting means.

5. A buffing machine having, in combination, a movable buffing tool, stopping and starting means for said tool, and suction means having a shut-off controlled by the said tool stopping and starting means.

6. A buffing machine having, in combination, a plurality of movable buffing tools, spindles for supporting said tools a dust conduit having inlets in coöperative relation with said tools, a shut-off for said conduit, stopping and starting means for said tools, and means under control of said stopping and starting means for operating the shut-off.

7. In a buffing machine the combination of a buffing tool, means for operating the same, a conduit having an inlet in proximity to said tool, a valve for said conduit, provisions for starting and stopping the tool operating means, and connections between the same and the conduit valve to cause the same to open the conduit when the tool is started and close the conduit when the tool is stopped.

In testimony whereof, I have signed my name to this specification, in the presence of two subscribing witnesses.

GEORGE F. STEWART.

Witnesses:
JOHN J. HEYS,
JOHN GELZENLICHTER.